(12) United States Patent
Kono et al.

(10) Patent No.: US 9,901,111 B2
(45) Date of Patent: Feb. 27, 2018

(54) TASTE-IMPROVING PEPTIDE

(75) Inventors: Masaharu Kono, Kanagawa (JP); Masato Ikeuchi, Kanagawa (JP)

(73) Assignee: Takasago International Corporation, Tokyo (JP)

( * ) Notice: Subject to any disclaimer, the term of this patent is extended or adjusted under 35 U.S.C. 154(b) by 325 days.

(21) Appl. No.: 14/131,339

(22) PCT Filed: May 7, 2012

(86) PCT No.: PCT/JP2012/002979
§ 371 (c)(1),
(2), (4) Date: Jan. 7, 2014

(87) PCT Pub. No.: WO2013/005362
PCT Pub. Date: Jan. 10, 2013

(65) Prior Publication Data
US 2014/0161934 A1    Jun. 12, 2014

(30) Foreign Application Priority Data
Jul. 7, 2011  (JP) ................. 2011-151249

(51) Int. Cl.
| A23L 27/00 | (2016.01) |
| A23L 2/56 | (2006.01) |
| A23L 2/60 | (2006.01) |
| A23C 9/13 | (2006.01) |
| A23F 3/16 | (2006.01) |
| A23L 27/21 | (2016.01) |
| A23L 27/30 | (2016.01) |

(52) U.S. Cl.
CPC ............ *A23L 27/88* (2016.08); *A23C 9/1322* (2013.01); *A23F 3/163* (2013.01); *A23L 2/56* (2013.01); *A23L 2/60* (2013.01); *A23L 27/21* (2016.08); *A23L 27/30* (2016.08); *A23L 27/31* (2016.08); *A23L 27/34* (2016.08); *A23L 27/37* (2016.08)

(58) Field of Classification Search
CPC .... A23L 1/227; A23L 1/2361; A23L 1/22091; A23L 2/56; A23C 9/1322
See application file for complete search history.

(56) References Cited

U.S. PATENT DOCUMENTS

| 4,006,261 A * | 2/1977 | Pickenhagen ....... A23L 1/22678 |
| | | 426/537 |
| 4,810,516 A * | 3/1989 | Kong-Chan ............. A23G 1/36 |
| | | 426/548 |

FOREIGN PATENT DOCUMENTS

| JP | 11-100328 | 4/1999 |
| JP | 200189500 | 3/2001 |
| JP | 3-168066 B2 | 5/2001 |
| JP | 2002255994 A | 9/2002 |
| JP | 2003104997 A | 4/2003 |
| JP | 2004267126 A | 9/2004 |
| JP | 2005336067 A | 12/2005 |
| JP | 200681502 | 3/2006 |
| JP | 2006160649 A | 6/2006 |
| JP | 2007182414 A | 7/2007 |
| JP | 2007267609 A | 10/2007 |
| WO | 02/19837 A1 | 3/2002 |

OTHER PUBLICATIONS

Masuyama et al., JP 411100328A, 1999, JPO Abstract.*
Nagai, Masaya-JP 2003 39313 A—(Derwent Abstract).*
English translation of the International Preliminary Report on Patentability for corresponding International application No. PCT/JP2012/002979, Jan. 16, 2014, 10 pages.
Gardner et al., "Correlation of Bitterness Thresholds of Amino Acids and Peptides with Molecular Connectivity", J. Sci. Agric., vol. 31, pp. 23-30 (1980).
Kim et al., "Quantitative Structure-Activity Relationship Study of Bitter Peptides", J. Agric. Food Chem., vol. 54, pp. 10102-10111 (2006).
Ringseis et al., "Peptides and hydrolysates from casein and soy protein modulate the release of vasoactive substances from human aortic endothelial cells", Biochimica et Biophysica Acta, vol. 1721, pp. 89-97 (2005).
Ishibashi et al., "Bitterness of Leucine-containing Peptides", Agric. Biol. Chem., vol. 51, No. 9, pp. 2389-2394 (1987).
Wu et al., "Quantitative structure-activity relationship study of bitter di- and tri-peptides including relationship with angiotensin I-converting enzyme inhibitory activity", J. Pept. Sci., vol. 13, pp. 63-69 (2007).
Shiraishi et al., "Taste of Proline-containing Peptides", Agr. Biol. Chem., vol. 37, No. 10, pp. 2427-2428 (1973).
Mojarro-Guerra et al., "Isolation of Low-Molecular-Weight Taste Peptides from Vacherin Mont d'Or Cheese", Journal of Food Science, vol. 56, No. 4, pp. 943-947 (1991).
Park et al., "Taste effects of oligopeptides in Vietnamese fish sauce", Fisheries Science, vol. 68, pp. 921-928 (2002).
Ishi et al., "Peptide no teimi Koka", New Food Industry, vol. 38, No. 4, pp. 23-28 (1996).
Fazheng Ren, et al., "Systemic screening of milk protein-derived ACE inhibitors through a chemically synthesised tripeptide library", Food Chemistry 128 (2011) 761-768.

(Continued)

*Primary Examiner* — Elizabeth Gwartney
(74) *Attorney, Agent, or Firm* — Mintz Levin Cohn Ferris Glovsky and Popeo, P.C.; Peter F. Corless

(57) ABSTRACT

To provide a milk-derived peptide having a taste-improving effect, a taste-improving agent comprising the same, and a food or drink containing the same. A taste-improving agent comprising a peptide, said peptide having the sequence(s) Val-Pro and/or Leu-Leu-Leu, and a food or drink to which the taste-improving agent is added.

5 Claims, No Drawings

(56) References Cited

OTHER PUBLICATIONS

Jiajian Yin, et al., "Studying Peptides Biological Activities Based on Multidimensional Descriptors (E) Using Support Vector Regression", Int. J. Pept. Res. Ther. (2010) 16:111-121.
Extended European search report issued in corresponding European Application No. 12807992.8, dated May 11, 2015, 10 pages.

* cited by examiner

TASTE-IMPROVING PEPTIDE

CROSS-REFERENCES TO RELATED APPLICATIONS

This application is a 35 U.S.C. § 371 U.S. national entry of International Application PCT/JP2012/002979 (WO 2013/005362) having an International filing date of May 7, 2012, which claims under 35 U.S.C. § 119(a) the benefit of Japanese Application No. 2011-151249, filed Jul. 7, 2011, the entire contents of which are incorporated herein by reference.

TECHNICAL FIELD

The present invention relates to a taste-improving agent containing a specific peptide and a food obtained by adding the same thereto.

BACKGROUND ART

With dietary diversification and increasing consciousness towards safety, security and health in recent years, many acidulous foods have been provided in particular.

Much importance has been placed on acids such as acetic acid and lactic acid not only because acids improve the shelf life, but also as a health-oriented food. However, if a sourness, a bitter taste, an astringent taste, a harsh taste or the like is too strong, it becomes difficult to eat the food. For example, there arises the problem that when a fermented milk drink is stored over a long period of time, fermentation proceeds too much and the sourness becomes too strong to appreciate. In addition, from a viewpoint of dieting, artificial sweeteners with fewer calories tend to be frequently used for a sweet taste. However, artificial sweeteners have a distinctively bad aftertaste and reduce palatability, which is problematic.

Although the taste of peptides has long been examined, many of the investigations are related to the bitter taste of peptides or related to a method for improving the bitter taste (Non-patent document 1 and Patent Document 1). On the other hand, as peptides leading to improvement of the quality and value of a food or a drink, peptides such as 4-residue peptide represented by Tyr-Glu-Glu-Glu or Tyr-Glu-Glu-Asp found during hydrolysis of an extraction residue of dried and fermented fish (Patent Document 2), the peptides with more than 11 residues such as Ala-Pro-Pro-Pro-Pro-Ala-Glu-Val-His-Glu-Val-Val found in a water extract of pork (Patent Document 3), the peptides having the sequence Trp-Val, Trp-Tyr, Tyr-Trp, Trp-Ile, Trp-Leu or Glu-Ile-Leu, respectively, which were found in an enzymatic decomposition product of milk protein such as α-lactalbumin, and have a taste-improving effect such as enhancing a richness, a savory taste (umami) and a sense of volume (Patent Document 4), and the peptides with a molecular weight of 200 to 20,000 obtained by hydrolyzing albumen (Patent Document 5) are known.

However, the taste-improving agents described in the above related art merely have an effect of imparting or enhancing a richness and a savory taste (umami), or their other taste-improving effects are not always sufficient. Especially, a sourness-masking effect and an aftertaste-improving effect of an artificial sweetener are insufficient.

In addition, it is also reported that Ile-Pro-Pro or Val-Pro-Pro which is a tripeptide having an angiotensin-converting enzyme inhibitory activity is used as an anti-stress agent (see Patent Document 6). However, these peptides are different from the peptide of the present invention and a taste-improving effect is not reported.

CITATION LIST

Patent Documents

Patent Document 1: JP 3-168066 A
Patent Document 2: JP 2002-255994 A
Patent Document 3: JP 2001-89500 A
Patent Document 4: JP 2006-160649 A
Patent Document 5: JP 2005-336067 A
Patent Document 6: JP 11-100328 A

Non-Patent Document

Non-Patent Document 1: J. Agric. Food. Chem. 2006, 54, 10102-10111

SUMMARY OF INVENTION

Technical Problem

An object of the present invention is to provide a milk-derived peptide having a taste-improving effect and a taste-improving agent containing the same, and to provide a food containing the same.

Solution to Problem

The present inventors focused attention on a taste-improving effect by a dairy product and intensively studied to find that a hydrolysate of milk protein also has a similar effect. As a result of further investigations, the present inventors found that a specific peptide has a strong taste-improving effect.

Accordingly, the present invention relates to a taste-improving agent comprising one or a mixture of two peptides selected from the group consisting of Val-Pro and Leu-Leu-Leu.

In addition, the present invention relates to a food or a drink to which one or a mixture of two peptides selected from the group consisting of Val-Pro and Leu-Leu-Leu are added in order to improve the taste of the food.

The present invention includes the following contents.

[1] A taste-improving agent comprising a peptide having the sequence Val-Pro and/or a peptide having the sequence Leu-Leu-Leu.
[2] The taste-improving agent as set forth above in [1], wherein the mass ratio of Val-Pro:Leu-Leu-Leu is 9:1 to 1:9 in a mixture of Val-Pro and Leu-Leu-Leu.
[3] The taste-improving agent as set forth above in [1] or [2], wherein Val-Pro or Leu-Leu-Leu is an enzyme-treated product of milk or a dairy product.
[4] The taste-improving agent as set forth above in [3], wherein the enzyme-treated product is a protease-treated product.
[5] The taste-improving agent as set forth above in any one of [1] to [4] which has an effect of improving the sourness of fermented milk, improving the aftertaste of an artificial sweetener or enhancing the richness of milk.
[6] A food and drink (a food or a drink to which the taste-improving agent (peptide) as set forth above in any one of [1] to [5] is added.
[7] A method for improving the taste of a food or a drink, wherein the taste-improving agent (peptide) as set forth above in any one of [1] to [5] is added to the food or the drink.

[8] The method as set forth above in [7], wherein the addition amount of the taste-improving agent is 10 ppb to 100 ppm based on the food or the drink.
[9] A taste-improving composition for food containing the peptide as set forth above in any one of [1] to [5] and an acceptable carrier as a food.
[10] The taste-improving composition as set forth above in [9] which is a food additive.
[11] A flavor composition containing the taste-improving agent (peptide) as set forth above in any one of [1] to [5].
[12] The flavor composition as set forth above in [11] containing 1 ppm to 10% of the peptide as the taste-improving agent.
[13] The flavor composition as set forth above in [11] or [12], wherein a flavor is selected from the group consisting of a milk-based flavor, a fruit-based flavor, a citrus-based flavor, a vanilla-based flavor, a coffee-based flavor, a western-liquor-based flavor, a low-malt beer/beer-based flavor and a tea-based flavor.
[14] A peptide having the sequence Val-Pro or Leu-Leu-Leu for use as a taste-improving composition for food.

Advantageous Effects of Invention

Addition of the taste-improving agent of the present invention can provide a food or a drink with high palatability such as a food or a drink with the sourness masked and a food or a drink whose aftertaste of an artificial sweetener is improved.

In addition, the taste-improving agent of the present invention has a strong taste-improving effect and can improve the taste of various health foods which have a strong sourness and are believed to be good for health, thereby making them easy to eat or drink. Further, when a food or a drink in which lactic acid fermentation continues is stored over a long period of time, the food or the drink becomes unsuitable for eating or drinking because its sourness becomes too strong. However, addition of the taste-improving agent of the present invention can improve the sourness, which also enables extension of the period which a milk fermented product is suitable for eating and drinking. In addition, since the taste-improving agent of the present invention can improve the aftertaste of an artificial sweetener, addition of an artificial sweetener becomes possible without reducing palatability, thereby providing a diet food with an excellent taste.

Further, the taste-improving agent of the present invention comprises a di- or tripeptide which is easily produced by chemical synthesis. Therefore, an inexpensive and safe taste-improving agent can be produced industrially.

MODES FOR CARRYING OUT THE INVENTION

Hereinafter, the present invention will be described in detail.

The peptide used in the present invention may be prepared by a chemical synthesis method such as a solid-phase method and a liquid-phase method using a peptide synthesizer and may be prepared using genetic engineering technique or enzymatic engineering technique. Thus produced peptide is used as a free peptide, however, it may also be a carboxylate thereof or may also be an alkyl ester having around 1 to 10 carbon atoms such as a methyl ester and an ethyl ester. Although the amino group at the amino terminal end is preferably free, it may also be a salt such as a hydrochloride and may also be modified with an acyl group having around 1 to 10 carbon atoms or the like.

Further, the peptide may be obtained by hydrolyzing a protein having the amino acid sequences as a raw material using an acid or an enzyme.

As the protein having the amino acid sequences, milk protein is preferable. There is no particular limitation as long as they are protein having the amino acid sequences such as, for example, various caseins such as α-S1-casein, α-S2-casein, β-casein and κ-casein and whey protein such as β-lactoglobulin. In addition, milk and dairy products containing the protein are also preferable protein-containing materials for applying to the present invention.

The milk includes, for example, cow milk as well as goat milk, ewe milk, buffalo milk, donkey milk and the like, and cow milk is especially preferable. The dairy products include, for example, skimmed milk powder, whole milk powder, skimmed condensed milk, condensed milk, buttermilk, condensed buttermilk, buttermilk powder, cheese, whey powder, WPC/WPI, MPC/MPI (TMP), acid casein, caseinate and the like.

The enzyme used in the present invention is a proteolytic enzyme and is also called as a protease or a peptidase. It is the enzyme which catalyzes the hydrolysis reaction of a peptide bond, and microorganism-originated, plant-originated and animal-organ-originated ones may be used. Such proteolytic enzymes include, for example, endopeptidases such as serine proteases, cysteine proteases, aspartic acid proteases and metal proteases; and exopeptidases such as aminopeptidases, dipeptidases, dipeptidyl aminopeptidases, dipeptidyl carboxypeptidases, serine carboxypeptidases and metal carboxypeptidases. These enzymes are commercially available and can be obtained easily.

The specific enzymes include, for example, papain W-40, protease A "Amano" SD, protease M "Amano" SD, protease P "Amano" 3SD, protease N "Amano" G, ProteAX, Umamizyme G, bromelain F (the above-mentioned are produced by Amano Enzyme Inc.), Kokulase P (produced by Sankyosha Co., Ltd.), Flavourzyme 1000 L, Alcalase 2.4 L, Neutrase 0.5 L Protamex (the above-mentioned are produced by novozymes), papain, Denapsin 10P, bioprase SP-4 (the above-mentioned are produced by Nagase ChemteX Corporation.), protease YP-SS (produced by YAKULT PHARMACEUTICAL INDUSTRY CO., LTD.) and the like.

These proteolytic enzymes may be used solely or as a combination of two or more kinds thereof. In addition, the enzyme may be added at one time, or it may also be divided and added 2 to 3 times to carry out the enzyme reaction.

Although the used amount of the proteolytic enzyme varies depending on the kind of the enzyme, the enzyme activity or the like, the range from about 10 units to about 100,000 units per 1 g of milk protein may be exemplified in general.

In addition, the temperature of the enzyme reaction is not particularly limited and is within the range containing the optimum temperature at which the enzyme activity is expressed. In general, the temperature is preferably 20 to 60° C. Moreover, the time of the enzyme reaction is not particularly limited and is preferably 1 to 96 h. Note that pH during the enzyme treatment is not particularly limited as long as the enzyme reaction proceeds, but the preferable range is pH 4 to 9. In addition, there is no particular need to adjust pH.

After completion of the enzyme treatment, it is preferable to inactivate the enzyme-treated mixture by heating at the temperature and time which correspond to the inactivation conditions of the used proteolytic enzyme. For example, it is preferable to inactivate the enzyme by heating at 70 to 90° C. for 10 to 60 min.

The peptide-containing mixture obtained by these methods may be used as the taste-improving agent as it is. However, the peptide-containing mixture may also be further purified to be used as the taste-improving agent. The purification method is not particularly limited, and it may generally be carried out by isolation and concentration methods and the like by methods such as column fractionation methods using a synthetic adsorbent, an ion-exchange resin and hydrophobic chromatography; molecular weight fractionation methods using gel filtration; and the like.

The taste-improving agent of the present invention may use Val-Pro or Leu-Leu-Leu solely, or it may also use a mixture of Val-Pro and Leu-Leu-Leu. As the mixture ratio when used as a mixture, the mass ratio of Val-Pro:Leu-Leu-Leu may be 1:9 to 9:1, preferably 9:1 to 3:7.

In addition, the usage form of the taste-improving agent of the present invention is not particularly limited. The peptide of the present invention may be used solely, or the peptide of the present invention may also be combined with a carrier for food as a taste-improving composition to be prepared in the form of liquid, powder, granule, emulsion, paste and the like as appropriate, thereby being able to obtain the taste-improving agent.

In addition, the taste-improving agent of the present invention may also be used as a seasoning by mixing with seasoning components such as other amino acids and nucleic acids. When used as a seasoning, the taste-improving agent of the present invention is preferably contained in an amount of from 0.1 ppm to 10%, preferably from 0.1 ppm to around 1% of the total of the seasoning.

Moreover, the taste-improving agent of the present invention may also be used as a flavor composition by combining with a flavor. The flavors include, for example, a milk-based flavor, a fruit-based flavor such as strawberry and apple, a citrus-based flavor, a vanilla-based flavor, a coffee-based flavor, a western-liquor-based flavor, a low-malt beer/beer-based flavor, a tea-based flavor or a tea flavor such as black tea, oolong tea and green tea. When used as a flavor composition, the taste-improving agent of the present invention is preferably contained in an amount of from 1 ppm to 10% and preferably from 1 ppm to around 1% of the total of the flavor composition.

The food obtaining a taste-improving effect by the peptide of the present invention is not particularly limited as long as the food is an acidulous food or a food containing an artificial sweetener. Preferable foods include, for example, a fermented dairy product, fermented milk drink and a food or a drink using an artificial sweetener. In addition, since the taste-improving agent of the present invention can enhance the richness of milk, the taste-improving agent may also be used for a food or a drink using milk or a dairy product such as cafe au lait and tea with milk.

The addition amount of the peptide of the present invention based on the food varies depending on the kind and formulation of the food. In general, addition of 10 ppb to 100 ppm and preferably 10 ppb to 10 ppm enables effective improvement of the taste of a food.

The taste-improving effects of the present invention include a sourness-masking effect of fermented milk, an aftertaste-improving effect of an artificial sweetener, an enhancing effect of the richness of milk, or the like.

EXAMPLES

Hereinafter, the present invention will be described in detail by way of Examples.

[Example 1] (Preparation and Identification of Peptide)

1. Production of Peptide Mixture by Enzymatic Decomposition

To 70 g of ion exchanged water, 24 g of TMP (H) (Total Milk Protein, produced by MORINAGA MILK INDUSTRY CO., LTD.) was dissolved and sterilized by heating. Then, the enzyme solution obtained by dissolving 0.5 g of protease A2G, 0.1 g of protease NG and 0.3 g of Flavourzyme 1000 L in 6 mL of water was added to the solution, and the enzyme reaction was carried out at 32° C. for 24 h while stirring. After that, the reaction mixture was heat-inactivated to obtain a peptide mixture.

2. Fractionation of Peptide Mixture by UF Membrane

The peptide mixture obtained in the above procedure 1 was centrifuged (20,000 G) to obtain an aqueous layer. The aqueous layer was treated with UF membranes of 20 nm, 5 kDa and 1 kDa, respectively, and permeate solutions were collected. Each permeate solution obtained through the UF membranes or the peptide mixture before treatment were added to a commercially available yoghurt drink. After the yoghurt drink was stored at 10° C. for 10 days, five special panelists conducted sensory evaluation regarding a sourness-masking effect. Note that each sample was prepared such that the addition amount is 0.1% calculated in terms of the peptide mixture. A commercially available yoghurt drink without addition was used as control. Evaluation was performed by scoring from 0 to 3 shown in Table 1 at 0.5 point intervals.

TABLE 1

| Evaluation Score | Evaluation |
| --- | --- |
| 0 | No effect |
| 1 | A little effect |
| 2 | Clear effect |
| 3 | Highest effect |

This result is shown in the following Table 2.

TABLE 2

| Sample Name | Evaluation Result |
| --- | --- |
| No Addition | 0.0 |
| Peptide Mixture | 2.1 |
| 20 nm Membrane Permeate Solution | 2.2 |
| 5 kDa Membrane Permeate Solution | 2.0 |
| 1 kDa Membrane Permeate Solution | 2.3 |

From this result, it was confirmed that the 1 kDa membrane permeate solution has the same or stronger taste-improving effect than the peptide mixture before treatment.

3. Fractionation of 1 kDa Membrane Permeate Solution by HPLC

From the above-mentioned results of sensory evaluation, the 1 kDa membrane permeate solution was further fractionated by HPLC. The 1 kDa membrane permeate solution was fractionated into 13 fractions from A fraction to M fraction under the following conditions.

Column: ODS-2 (0 20×250 mm)
Eluent: water/ethanol
Flow rate: 3.0 mL/min.
Detector: UV (220 nm)
Temp: 40° C.

In the same manner as in the above procedure 2, the obtained 13 fractions were added to a commercially available yoghurt drink, respectively. After the yoghurt drink was stored at 10° C. for 10 days, five special panelists conducted sensory evaluation regarding a sourness-masking effect. Each sample was prepared such that the addition amount is 0.1% calculated in terms of the peptide mixture. The evaluation method is the same as in the above procedure 2. As a result, it was confirmed that the fraction E has the same high taste-improving effect as the peptide mixture obtained in the above procedure 1.

4. This Fraction was Further Subjected to HPLC (Gel Filtration Column) Fractionation Under the Following Conditions to Divide into Four Fractions from E-1 Fraction to E-4 Fraction.

Column: Shodex SB401-4E (4.6 mm I.D.×250 mL)
Eluent: $H_2O$
Flow rate: 0.2 mL/min.
Detector: UV (220 nm)
Temp: 30° C.

In the same manner as in the above procedure 2, the obtained four fractions were added to a commercially available yoghurt drink, respectively. After the yoghurt drink was stored at 10° C. for 10 days, five special panelists conducted sensory evaluation regarding a sourness-masking effect. Each sample was prepared such that the addition amount is 0.1% calculated in terms of the peptide mixture. The evaluation method is the same as in the above procedure 2. As a result, it was confirmed that the fraction E-3 has the same high taste-improving effect as the peptide mixture obtained in the above procedure 1.

5. Structural Analysis of Peptide

The fraction obtained in the above procedure 4 was lyophilized and the peptides included therein were identified. Based on the results of LCMS-IT-TOF RP-ESI-MS/MS under the conditions shown below, Manual de novo sequencing was conducted.

As a result, the following five kinds of peptide were identified as major components:

Val-Pro-Pro (Hereinafter, it is described as VPP in single letter code);

Leu-Pro-Pro (Hereinafter, it is described as LPP in single letter code);

Val-Pro (Hereinafter, it is described as VP in single letter code);

Leu-Leu-Leu (Hereinafter, it is described as LLL in single letter code);

Leu-Leu-Leu-Leu (Hereinafter, it is described as LLLL in single letter code); and phenylalanine (It is described as F in single letter code).
Column: ODS3 (2 mm i.d., 150 mm, 3 um)
Gradient: A: 0.1% Formic acid,
B: Acetonitrile
Auto MS/MS range: 200 to 800 Da
CID energy: 80 to 100%

[Example 2] (Evaluation of Taste-Improving Effect of Peptide)

The five kinds of peptide identified in Example 1 and phenylalanine were added to a commercially available yoghurt drink, respectively. After the yoghurt drink was stored at 10° C. for 10 days, five special panelists conducted sensory evaluation regarding a sourness-masking effect. The peptide mixture obtained in Example 1-1 was added in an amount of 0.1%, the peptides and phenylalanine obtained in Example 1-5 were added in an amount of 20 ppb and the mixture of VP+LLL was added in an amount of 10 ppb each. The evaluation method was the same as in Example 1-2.

The results are shown in the following Table 3.

TABLE 3

| Sample Name | Evaluation Result |
| --- | --- |
| Peptide Mixture | 2.4 |
| LPP | 0.3 |
| VP | 1.3 |
| LLLL | 0.3 |
| LLL | 1.4 |
| VPP | 0.2 |
| F | 0.1 |
| VP + LLL | 2.3 |

From this result, the two kinds of peptide: VP and LLL, were confirmed to have a remarkable sourness-masking effect. Further, the same high taste-improving effect as the peptide mixture was confirmed by combining these two kinds of peptide.

[Example 3] (Minimum Addition Amount of Peptide)

VP and LLL were mixed in the mixture ratio within the range from 1:9 to 9:1 and each mixture was added to a commercially available yoghurt drink in an amount of 0.01 ppm. After the yoghurt drink was stored at 10° C. for 10 days, five special panelists conducted sensory evaluation regarding a sourness-masking effect. The evaluation method is the same as in the Example 1-2. The results are shown in the following Table 4.

TABLE 4

| Sample Name | Evaluation Result |
| --- | --- |
| Peptide Mixture | 2.4 |
| VP | 1.4 |
| VP:LLL = 9:1 | 2.1 |
| VP:LLL = 7:3 | 2.4 |
| VP:LLL = 5:5 | 2.4 |
| VP:LLL = 3:7 | 2.1 |
| VP:LLL = 1:9 | 1.6 |
| LLL | 1.3 |

From this result, it was confirmed that VP and LLL each may be used solely, however, inclusion of VP and LLL with the mixture ratio of 9:1 to 3:7 especially generated a synergistic effect and exhibited a higher sourness-masking effect than each peptide alone.

[Example 4] (Minimum Addition Amount of Peptide)

VP, LLL and the mixture of equal parts of VP and LLL were added to a commercially available yoghurt drink in an amount of 0.001 ppm, 0.01 ppm and 0.1 ppm, respectively. After the yoghurt drink was stored at 10° C. for 10 days, five special panelists conducted sensory evaluation regarding a sourness-masking effect. The evaluation method is the same as in the Example 1-2. The results are shown in the following Table 5.

TABLE 5

| Sample Name | Addition Concentration [ppm] | Evaluation Result |
|---|---|---|
| Peptide Mixture | 1000 | 2.4 |
| LLL | 0.001 | 0.3 |
| LLL | 0.01 | 1.4 |
| LLL | 0.1 | 1.5 |
| VP | 0.001 | 0.2 |
| VP | 0.01 | 1.5 |
| VP | 0.1 | 1.5 |
| VP:LLL = 1:1 | 0.001 | 0.5 |
| VP:LLL = 1:1 | 0.01 | 2.3 |
| VP:LLL = 1:1 | 0.1 | 2.4 |

From this result, it was confirmed that all of VP alone, LLL alone and the mixture of equal parts of VP:LLL have a high sourness-masking effect with the concentration of 0.01 ppm or more.

[Example 5] (Aftertaste-Improving Effect of Artificial Sweetener)

To a commercially available black tea beverage (straight tea) using artificial sweeteners (xylitol, acesulfame K and sucralose), the peptide mixture and the mixture of equal parts of VP and LLL were added. Five special panelists conducted sensory evaluation regarding an aftertaste-improving effect of a sweet taste. The peptide mixture was added in an amount of 0.02% and the mixture of equal parts of VP and LLL was added in an amount of 0.001 ppm, 0.01 ppm and 0.1 ppm, respectively. The evaluation method was the same as in Example 1-2. The results are shown in the following Table 6.

TABLE 6

| Addition Component | Concentration [ppm] | Evaluation Result |
|---|---|---|
| No Addition | | 0.0 |
| Peptide Mixture | 200 | 2.3 |
| VP:LLL = 1:1 | 0.001 | 0.9 |
| VP:LLL = 1:1 | 0.01 | 2.2 |
| VP:LLL = 1:1 | 0.1 | 2.1 |

As a result, it was confirmed that the mixture of equal parts of VP and LLL has a remarkable aftertaste-improving effect of the sweet taste of an artificial sweetener with the concentration of 0.01 ppm or more.

[Example 6] (Enhancing Effect of Richness of Milk)

The peptide mixture and the mixture of equal parts of VP and LLL were added to a commercially available tea with milk, and five special panelists conducted sensory evaluation regarding an enhancing effect of the richness of milk. The peptide mixture was added in an amount of 0.10% and the mixture of equal parts of VP and LLL was added in an amount of 0.01 ppm, 0.1 ppm and 1 ppm, respectively. The evaluation method was the same as in the Example 1-2. The results are shown in the following Table 7.

TABLE 7

| Addition Component | Concentration [ppm] | Evaluation Result |
|---|---|---|
| No Addition | | 0.0 |
| Peptide Mixture | 1000 | 2.5 |
| VP:LLL = 1:1 | 0.01 | 1.0 |
| VP:LLL = 1:1 | 0.1 | 2.4 |
| VP:LLL = 1:1 | 1.0 | 2.6 |

As a result, it was confirmed that the mixture of equal parts of VP and LLL has a remarkable enhancing effect of the richness of milk with the concentration of 0.1 ppm or more.

INDUSTRIAL APPLICABILITY

The present invention provides a taste-improving agent comprising a specific di- or tripeptide, which is useful for improving the taste of various foods, especially health foods and foods containing an artificial sweetener, and therefore, has applicability in the food industry.

The invention claimed is:

1. A method for improving the aftertaste of an artificial sweetener, comprising:

Adding a taste-improving agent comprising a peptide having the sequence Val-Pro and a peptide having the sequence Leu-Leu-Leu to a drink comprising the artificial sweetener, wherein the mass ratio of Val-Pro:Leu-Leu-Leu is 9:1 to 3:7 in a mixture of Val-Pro and Leu-Leu-Leu, wherein the addition amount of the mixture of Val-Pro and Leu-Leu-Leu is 10 ppb to 100 ppm based on the drink comprising the artificial sweetener.

2. The method according to claim 1, wherein the drink is tea.

3. A method for enhancing the richness of milk, comprising:

adding a taste-improving agent comprising a peptide having the sequence Val-Pro and a peptide having the sequence Leu-Leu-Leu to a drink comprising milk or a dairy product, wherein the mass ratio of Val-Pro:Leu-Leu-Leu is 9:1 to 3:7 in a mixture of Val-Pro and Leu-Leu-Leu, wherein the addition amount of the mixture of Val-Pro and Leu-Leu-Leu is 100 ppb to 100 ppm based on the drink comprising milk or the dairy product.

4. A taste-improving agent consisting of a peptide having the sequence Val-Pro and a peptide having the sequence Leu-Leu-Leu, wherein the mass ratio of Val-Pro:Leu-Leu-Leu is 9:1 to 3:7 in a mixture of Val-Pro and Leu-Leu-Leu.

5. A food or a drink to which the taste-improving agent according to claim 4 is added, wherein the addition amount of the mixture of Val-Pro and Leu-Leu-Leu is 10 ppb to 100 ppm based on the food or the drink.

* * * * *

SEQUENCE LISTING

```
<160> NUMBER OF SEQ ID NOS: 3

<210> SEQ ID NO 1
<211> LENGTH: 4
<212> TYPE: PRT
<213> ORGANISM: Unknown
<220> FEATURE:
<223> OTHER INFORMATION: extract of dried bonito

<400> SEQUENCE: 1

Tyr Glu Glu Glu
1

<210> SEQ ID NO 2
<211> LENGTH: 4
<212> TYPE: PRT
<213> ORGANISM: Unknown
<220> FEATURE:
<223> OTHER INFORMATION: extract of dried bonito

<400> SEQUENCE: 2
```

```
Tyr Glu Glu Asp
1

<210> SEQ ID NO 3
<211> LENGTH: 12
<212> TYPE: PRT
<213> ORGANISM: Sus scrofa

<400> SEQUENCE: 3

Ala Pro Pro Pro Pro Ala Glu Val His Glu Val Val
1               5                   10
```